United States Patent
Stevenson et al.

(10) Patent No.: US 8,395,994 B2
(45) Date of Patent: Mar. 12, 2013

(54) SYSTEM AND METHOD FOR ADAPTIVE CALL MANAGEMENT

(75) Inventors: Craig Stevenson, Mesa, AZ (US); Vidur Apparao, San Mateo, CA (US)

(73) Assignee: LiveOps, Inc., Redwood City, CA (US)

( * ) Notice: Subject to any disclaimer, the term of this patent is extended or adjusted under 35 U.S.C. 154(b) by 351 days.

(21) Appl. No.: 12/589,831

(22) Filed: Oct. 28, 2009

(65) Prior Publication Data

US 2011/0096673 A1    Apr. 28, 2011

(51) Int. Cl.
*H04L 12/26* (2006.01)
*H04M 3/00* (2006.01)
(52) U.S. Cl. .................. 370/238; 370/468; 379/243
(58) Field of Classification Search .......... 370/229–235, 370/237, 238, 252, 464, 468, 400, 401; 379/242, 379/243, 900
See application file for complete search history.

(56) References Cited

U.S. PATENT DOCUMENTS

| | | | |
|---|---|---|---|
| 6,594,277 B1* | 7/2003 | Chiang et al. | 370/465 |
| 6,882,640 B1* | 4/2005 | Berger et al. | 370/353 |
| 2004/0153549 A1* | 8/2004 | Naito et al. | 709/228 |
| 2006/0136716 A1* | 6/2006 | Cho et al. | 713/151 |
| 2007/0005417 A1* | 1/2007 | Desikan et al. | 705/14 |
| 2007/0183402 A1* | 8/2007 | Bennett et al. | 370/352 |
| 2009/0116379 A1* | 5/2009 | Rahman | 370/229 |
| 2011/0223957 A1* | 9/2011 | Pietraski | 455/514 |

* cited by examiner

*Primary Examiner* — Kerri Rose
(74) *Attorney, Agent, or Firm* — PatentEsque Law Group, LLP

(57) ABSTRACT

A system for adaptive call management, comprising a network-connected call manager server and a call switching means coupled to the call manager server and adapted to deliver calls to a selected target via a plurality of media channels, wherein upon receipt of a call quality indicium from a call quality monitoring means associated a media channel, the call manager server selects a specific media channel, is disclosed.

31 Claims, 6 Drawing Sheets

SYSTEM AND METHOD FOR ADAPTIVE CALL MANAGEMENT

CROSS-REFERENCE TO RELATED APPLICATIONS

None.

BACKGROUND OF THE INVENTION

1. Field of the Invention

The present invention is in the field of telecommunications, and in particular to the field of management of voice calls in order to minimize call cost while maintaining satisfactory call voice quality.

2. Discussion of the State of the Art

When the contact center industry first arose some forty years ago, there was only one way to deliver voice calls, which is to say via a telephone network to standard telephone endpoints. In fact, forty years ago there was only one long distance provider in the United States, which enjoyed a government-regulated monopoly of long-distance telephony (the situation was generally the same in other countries). Contact centers (often also called call centers, which for purposes of the present application will be considered synonymous with contact centers) began to emerge in the United States as a result of the introduction of toll-free 800 numbers, which made it possible for large enterprises to encourage their customers to call them via a nationwide number that did not incur toll charges and therefore did not cost customers anything. Previously, as long-distance rates were high enough that people thought twice before making a long-distance call, it would have been highly unlikely for a consumer to call a national company, incurring long-distance charges, for anything other than substantial reasons. The growth of contact centers in the ensuing forty years has been nothing short of dramatic, with several million Americans now working in contact centers.

While the call management options available to enterprises forty years ago were extremely limited, the opposite is true today. There are numerous long-distance network operators, each with different strengths and weaknesses. Calls can be delivered not only over traditional telephones, but also using Internet Protocol (IP) telephony systems, and terminal devices can be "regular" phones with "plain old telephony service" (POTS), digital phones with Channel-Associated Signaling (CAS) or Integrated Services Digital Network (ISDN) service, or headsets connected to personal computers or workstations which either have an analog card, digital time division multiplexing (TDM) card or have an IP telephone software installed. Moreover, while in the early days of the industry agents were typically located centrally at a single facility at which a private branch exchange (PBX) with automated call distribution software (ACD) software either installed or operating on a server closely tied to the PBX, today agents are often distributed across several domestic or international call center locations, and many even work from home or small branch offices. Additionally, call switching devices are now sometimes located "in the cloud", which might be either a telephony carrier's facility, or a facility provided by non-telephony focused third parties, or at one or more centralized data centers. Data centers serving large scale contact centers operated by an enterprise desiring to serve its customers are often sited in order to take advantage of inexpensive electrical power or readily available large scale data networking infrastructure, while call centers are often located in small and medium-sized communities with available labor pools and low labor costs. And third party companies often operate data centers; in fact, it is not at all uncommon to have multiple parties involved in "value chains" that deliver service to consumers. These examples are but samples of the many ways in which contact centers have become more complex since their origins forty years ago.

One constant amidst all of the emerging complexity of large-scale contact centers is the need for quality, as perceived by the customers of an enterprise. While there are several factors that contribute to quality, such as time spent waiting to speak to an agent, attitude of agents, and whether a desired service was indeed received, one aspect that is assumed in developed countries is that the quality of the voice signals used in service situations should be excellent. Consumers do not enjoy being misunderstood because of poor connections, and even more they do not enjoy hearing poor sound quality; when a consumer calls a major bank, she assumes the sound quality will be at least as good as what she grew up with. Clearly, providing high quality audio or voice channels during service calls is a necessary element of high quality service (a newer development that makes this even more important is the fact that, in some cases, even the agents who serve customers are independent of the enterprise, and may have choices as to which enterprises to serve as contractor agents possibly working at home; alienating agents by providing poor voice channel quality is also an important quality factor in these situations). Also, when enterprises carry calls between facilities under their control using their own IP networks, it is important that call quality is maintained in order that expensive knowledge workers are not annoyed or made less productive by poor-quality phone calls and the ensuing communications challenges.

Enterprises clearly desire to enjoy the economic advantages that IP telephony provides, particularly lower cost (because it is less expensive per minute of talk time to carry a call over a general-purpose leased data network rather than a toll call) and increased flexibility (because enterprises can directly control the distribution of calls more easily when they are all carried on a common network backbone under their control). In the art, several approaches have emerged to balance the desire to shift to IP telephony against the need for maintaining call quality. One of these is the management of network quality of service (QoS) generally. Another is the reservation of dedicated bandwidth for high-priority, real-time uses such as carrying telephone calls or videoconferences (typically, large data-centric uses can function well with varying QoS as long as an aggregate minimum bandwidth is maintained, but with real-time uses, even short dips in bandwidth can cause important quality issues). There are many techniques available in the art for monitoring the quality of a given telephone call, including but not limited to R Factor, Mean Opinion Score (MOS), RTCP XR, P.861 (PSQM)/P.862 and monitoring call completion or dropped call rates, any combination of which may be used by enterprises to measure call quality on a call-by-call basis (non-intrusive monitoring) or through the use of active test calls.

However, when agents (in contact center situations) or other employees of an enterprise are located either at home or at small, distributed facilities, often connected to the enterprise's core data and networking systems by infrastructure not under the control of the enterprise (for example, a home agent using a DSL line provided by his phone carrier and connecting to an enterprise via a virtual private network), it is much harder for enterprises to ensure adequate call quality, and in many cases enterprises elect to adopt higher-cost media channels, such as long-distance telephony or ISDN lines, to ensure that problems do not occur. In these cases, it becomes nearly impossible for the enterprise to ensure voice quality; nevertheless, it is still economically desirable to use IP telephony when possible. What is needed is the ability for an enterprise to use IP telephony when quality is good, but to switch seamlessly to TDM (or POTS) when call quality degrades.

Accordingly, it is an object to provide a system and methods for adaptively managing call quality in order to allow maximum use of low-cost channels such as IP telephony while maintaining quality within acceptable boundaries, and to allow for real-time optimization of the combination of quality and cost without losing any calls in progress.

SUMMARY OF THE INVENTION

In a preferred embodiment of the invention, a system for adaptive call management, comprising a network-connected call manager server and a call switching means coupled to the call manager server and adapted to deliver calls to an endpoint via at least a connection-oriented telephone and an internet protocol telephony endpoint, is disclosed. According to the embodiment, upon receipt of a call quality indicium from a call quality monitoring means associated with a media channel, the call manager server selects a specific media channel. Media channels may also be referred to as media routing paths or media paths, and may comprise one or more of a telephony call using analog or digital time-division multiplexing (TDM) telephony such as integrated services digital network (ISDN), an internet protocol (IP) telephony session, a video conference or video telephony session established using a protocol such as SIP/RTP or H.323, a streaming audio feed with or without a feedback capability, or even an instant messaging (IM) session. It will be appreciated by those having ordinary experience in the art that there are many possible individual or combined media channels (e.g., voice, video, collaborative desktop) or media routing paths that may be used to establish a synchronous, or simultaneous, two-way communications channel between two entities, without departing from the scope of the invention. According to another embodiment of the invention, the selection of a media channel is based at least in part on a cost associated with each of the available channels. In yet another embodiment of the invention, the selection of a media channel is made based at least on a comparison of the call quality indicium with an allowable range. In a further embodiment of the invention, when the call quality indicium falls outside of an acceptable range during a call, an alternate media channel is selected and the call is switched to the alternate media channel. In yet another embodiment of the invention, switching of a call from one media channel to an alternate channel is accomplished without audible indication of said switching to a call participant. In yet another embodiment of the invention, switching of a call from one media channel to an alternate channel is accomplished with audible indication of said switching to a call participant. In yet another embodiment of the invention, switching of a call from one media channel to an alternate channel is accomplished with the active involvement of a call participant. Various combinations are envisioned according to the invention; for instance, a media channel is selected, in some embodiments, by considering cost and by comparing a quality indicium to an acceptable range. Media channels comprise one or more of internet protocol telephony sessions, connection-oriented telephony circuits, ISDN circuits, videophone sessions, and the like. In some embodiments of the invention, quality indicia from more than one type of media channel are compared in order to select a media channel.

In another embodiment of the invention, a method for adaptive call management, comprising the steps of (a) obtaining an indicium of call quality from a call quality monitoring means, and (b) selecting a media channel based at least in part on the call quality indicium, is disclosed. In a further embodiment of the invention, a method for adaptive call management, comprising the steps of (a) obtaining an indicium of call quality from a call quality monitoring means, and (b) selecting a media channel based at least in part on comparing the call quality indicium to an acceptable range, is disclosed. In a further embodiment of the invention, a method for adaptive call management, comprising the steps of (a) obtaining an indicium of call quality from a call quality monitoring means, and (b) selecting a media channel based at least in part on the call quality indicium and a cost associated with each available media channel, is disclosed. Various combinations are envisioned by the inventors, for example in step (b) selecting a media channel based at least in part on the call quality indicium falling outside an acceptable range and a cost associated with each available media channel.

In another embodiment of the invention, a method for adaptive call management, comprising the steps of (a) obtaining an indicium of call quality from a call quality monitoring means, and (b) selecting a media channel based at least in part on comparing the call quality indicium to an acceptable range, and (c) when the call quality indicium falls out of an acceptable range during a call, switching the call the to an alternate media channel, is disclosed. In yet another embodiment of the invention, a method for adaptive call management, comprising the steps of (a) obtaining an indicium of call quality from a call quality monitoring means, and (b) selecting a media channel based at least in part on comparing the call quality indicium to an acceptable range, and (c) when the call quality indicium falls out of an acceptable range during a call, switching the call the to an alternate media channel, wherein the switching of a call from one media channel to an alternate media channel is accomplished without audible indication to a participant in the call, is disclosed. In yet another embodiment of the invention, a method for adaptive call management, comprising the steps of (a) obtaining an indicium of call quality from a call quality monitoring means, and (b) selecting a media channel based at least in part on comparing the call quality indicium to an acceptable range, and (c) when the call quality indicium falls out of an acceptable range during a call, switching the call the to an alternate media channel, wherein the switching of a call from one media channel to an alternate media channel is accomplished with audible indication to a participant in the call, is disclosed. In yet another embodiment of the invention, a method for adaptive call management, comprising the steps of (a) obtaining an indicium of call quality from a call quality monitoring means, and (b) selecting a media channel based at least in part on comparing the call quality indicium to an acceptable range, and (c) when the call quality indicium falls out of an acceptable range during a call, switching the call the to an alternate media channel, wherein the switching of a call from one media channel to an alternate media channel is accomplished with active participation by a participant in the call, is disclosed.

According to another preferred embodiment of the invention, a system for adaptive call management, comprising a network-connected call manager server, a quality server coupled to the call manager server, a quality monitoring means coupled to the call manager server and the quality server and adapted to monitor quality of calls, a quality database adapted to receive at least time-stamped quality indicium from the quality monitoring server, and a call switching means coupled to the call manager server and adapted to deliver calls to a selected target via a plurality of channels, is disclosed. According to the embodiment, upon receipt of a call quality indicium from the quality monitoring server, and responsive to at least one historical call indicium obtained from the quality database, the call manager server selects a media channel for the call.

According to another preferred embodiment of the invention, a system for adaptive call management, comprising a network-connected call manager server, a quality server coupled to the call manager server, a quality database adapted to receive at least time-stamped quality indicium from a quality monitoring means, and a call switching means coupled to the call manager server and adapted to deliver calls to a selected target via a plurality of channels, is disclosed. According to the embodiment, upon receipt of a plurality of call quality indicium from the quality database, the call manager server selects a media channel for the call.

According to another preferred embodiment of the invention, a system for adaptive call management, comprising a network-connected call manager server, a quality server coupled to the call manager server, a quality monitoring means coupled to the call manager server and the quality server and adapted to monitor quality of calls, a quality database adapted to receive at least time-stamped quality indicium from the quality monitoring server, and a call switching means coupled to the call manager server and adapted to deliver calls to a selected target via a plurality of media channels, is disclosed. According to the invention, the quality server, on receiving a call quality indicium from the quality monitoring server, compares the call quality indicium to at least one historical call quality indicium obtained from quality database, and the quality server computes an expected future call quality indicium based at least on the call quality indicium received from the quality monitoring server and on the at least one historical call quality indicium, and compares this future call quality indicium to an allowable range, and if the future call quality indicium falls outside of the allowable range, the quality server selects an alternate media channel.

BRIEF DESCRIPTION OF THE DRAWING FIGURES

DETAILED DESCRIPTION

Figure 1:
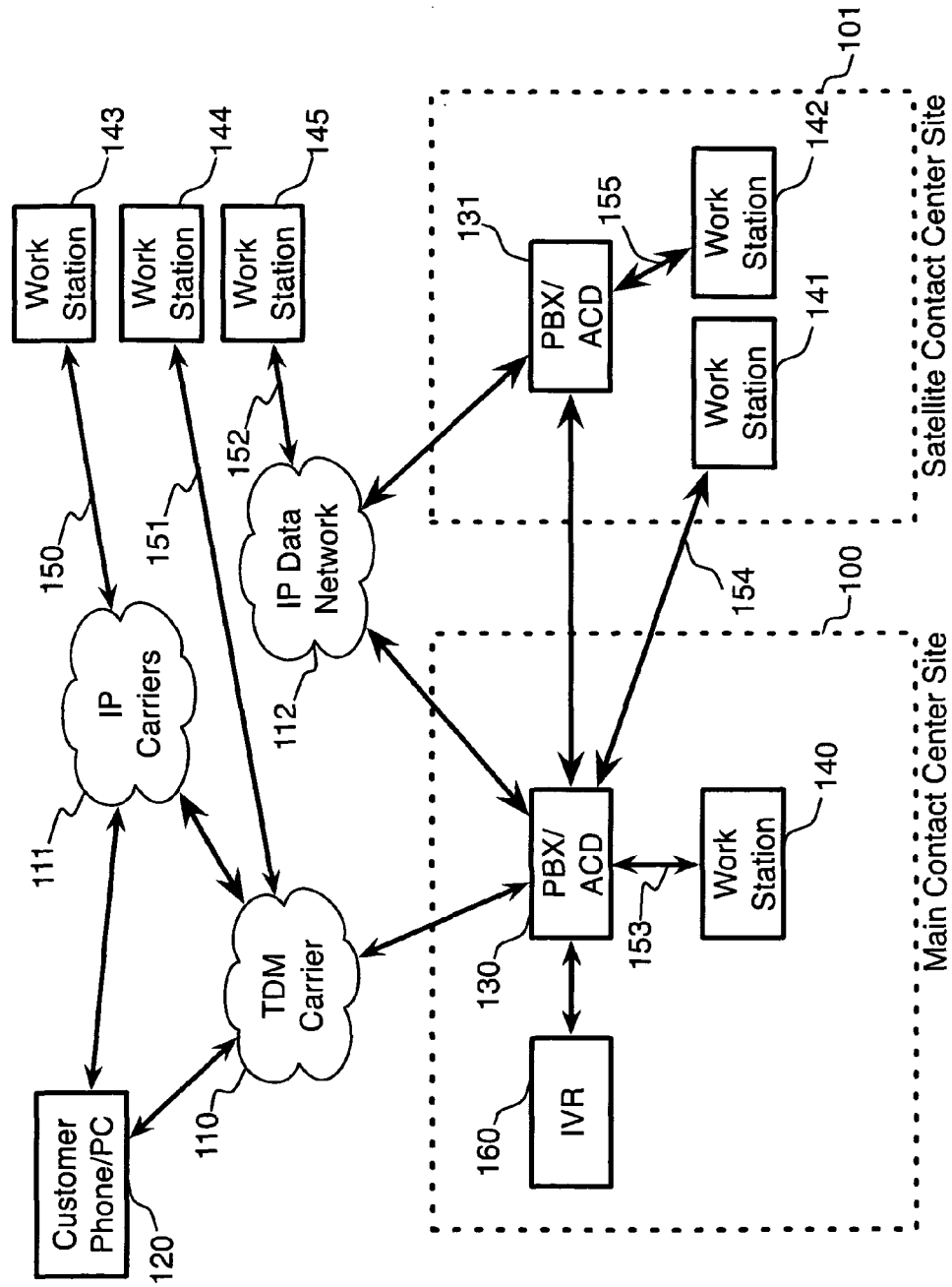
FIG. 1 (Prior Art) is a block diagram showing various call delivery architectures known in the art.

The inventors provide, in a preferred embodiment of the invention, a system and methods for adaptive call management. FIG. 1 illustrates a variety of common call management architectures according to the art, and is provided to illustrate the roles of various components already known in the art, in order to facilitate understanding of what is new according to the invention. The examples shown in FIG. 1 are drawn with respect to common contact center architectures, in which a consumer or customer of an enterprise calls (or is called) by an enterprise, and in which the consumer ultimately ends up speaking with an agent, who may be either an automated agent, an employee of the called enterprise, an employee of a partner of the enterprise, an employee of a call center outsourcer, or an independent contractor, although the invention is not limited to these. The choice of a contact center scenario for most exemplary illustrations does not limit the scope of the invention, which can equally be carried out in order to adaptively manage calls between employees of an enterprise, between one or more employees of an enterprise and one or more people outside the enterprise or in another enterprise, or even between two consumers using peer-to-peer computer-mediated communications. A customer calls (or is called; for the balance of this specification, reference will be made to inbound calls, but it should be understood that notwithstanding this choice taken for convenience, the invention is not limited to inbound calls) an enterprise from a phone or personal computer, or customer station 120. A customer at customer station 120 establishes calls via a regulated common carrier (for instance, a TDM-based common or an IP-based common carrier) over the public switched telephony network (PSTN) 110, via an unregulated interne protocol (IP) telephony solution 111, or via a public or private IP data network 112 in which case connections may be made directly from customer station 120 to an enterprise. In most cases, unregulated IP carrier 111 does not provide toll-free services to enterprises, so most calls from consumers are delivered to enterprises via a PSTN carrier 110. Because the majority of the high-quality PSTN carriers currently utilize TDM technology, the use of TDM carrier in this document is used to illustrate a higher quality carrier (which typically is PSTN-based and has higher cost). And likewise, the use of IP carrier is used to illustrate, by way of example, a lower-quality carrier (PSTN-based or unregulated) that typically has lower cost. Throughout this specification, examples are provided of various telephony configurations in which adaptive call management according to the invention may be practiced. These examples should not be taken as limiting, as it will be appreciated by those having ordinary skill in the art that any carrier and telephony routing architecture known in the art may be improved by use of the present invention; the goal of the invention is to provide a system and various methods for adaptive call management by intelligently choosing from among a variety of possible media channels or media routing paths to establish a call or session between a calling (or called) consumer at station 120 and a target recipient at one of stations 140-145, either prior to routing the call or session or after has originally been delivered to a selected destination (as when quality degrades on the selected media channel after call or session establishment). For example, in some embodiments enterprises contract with regulated common carriers to provide regulated toll-free service via an IP backbone, and consumers' calls may in these cases never traverse any TDM infrastructure (depending on how the local loop is configured).

Consumer calls are, in an exemplary situation known in the art, delivered from TDM carrier 110 to a private branch exchange (PBX) 130, and the PBX is usually equipped or coupled with an automated call distribution (ACD) system, which is generally a software application residing and running either on the PBX 130 or on a server computer connected via a (usually dedicated) data link to the PBX 130. For the purposes of this specification, ACD functionality will be treated as part of the PBX 130, and either term (PBX or ACD) may be used to refer to a system capable of carrying out telephony switching services in an enterprise. Furthermore, it will be recognized by those having ordinary skill in the art that the terms PBX and ACD are not exclusive but are exemplary, as there are other devices that serve similar functions. For example, in some enterprises the PBX/ACD pair 130 is replaced by a media server (which handles media switching, and is analogous to a PBX) and a media application server (which hosts software for call routing and other media applications, and is analogous to the ACD). ACD 130 or its equivalents, are often located at a main contact center site 100, although in some cases it is located "in the cloud", either in a facility managed by the same or another carrier, or in a facility managed by a dedicated cloud services provider. In yet other cases, ACD 130 is located in a data center (operated either by the called enterprise or by one of its partners), and calls are extended from the data center (or from the cloud) to an appropriate destination determined by ACD 130. ACD 130, on receiving a call (or indications of an incoming call) from a carrier, carries out programmable routing logic to determine where to send the call. In many cases, calls are initially sent to an interactive voice response (IVR) unit 160, where initial greetings and menus are played to callers, and where in some cases self-service capabilities are provided to callers (IVR 160 is in some cases located architecturally "in front" of ACD 130, which means calls actually terminate from carrier 110 on IVR 160 and are then passed from IVR 160 to PBX/ACD 130 when an agent is needed).

According to the art, there are innumerable ways in which calls are distributed from an ACD to an appropriate agent. In some cases, an agent at workstation 140 located in main contact center site 100 receives calls from ACD 130 located at the same site 100. In other cases, when all agents at site 100 are busy (or at least all agents with appropriate skills for a particular call), it is desirable to send the call to an agent at a satellite site 101. In some cases, this is accomplished by sending the call to ACD 131 at satellite site 101 and then ACD 131 sends the call to an agent workstation 142. In other cases, ACD 130 at site 100 sends calls directly to agents at workstations 141 at satellite site 101 (note that there could be any number of satellite sites, and indeed more than one "main" site that receives calls initially from carriers 110). Additionally, in some cases ACD 130 sends a call via IP data network 112 to a remote agent at workstation 145; other remote agent scenarios include transferring via TDM carrier 110 to workstation 144 and transferring via TDM carrier 110 to an agent at workstation 143 who uses IP carrier 111 for telephony. In these various cases, a customer call is delivered from ACD 130 to an agent as an internal digital phone call 153, an extended digital phone call using enterprise equipment 154, a remote internal digital phone call 155, an IP telephony call (or session) 152 carried via a leased or public IP data network 112, a PSTN TDM telephone call 151, or an IP telephony call 150 carried by a dedicated IP telephony carrier 111. These examples show just some of the wide variety of architectures for delivering customer calls to agents at workstations, according to the art.

Figure 2:
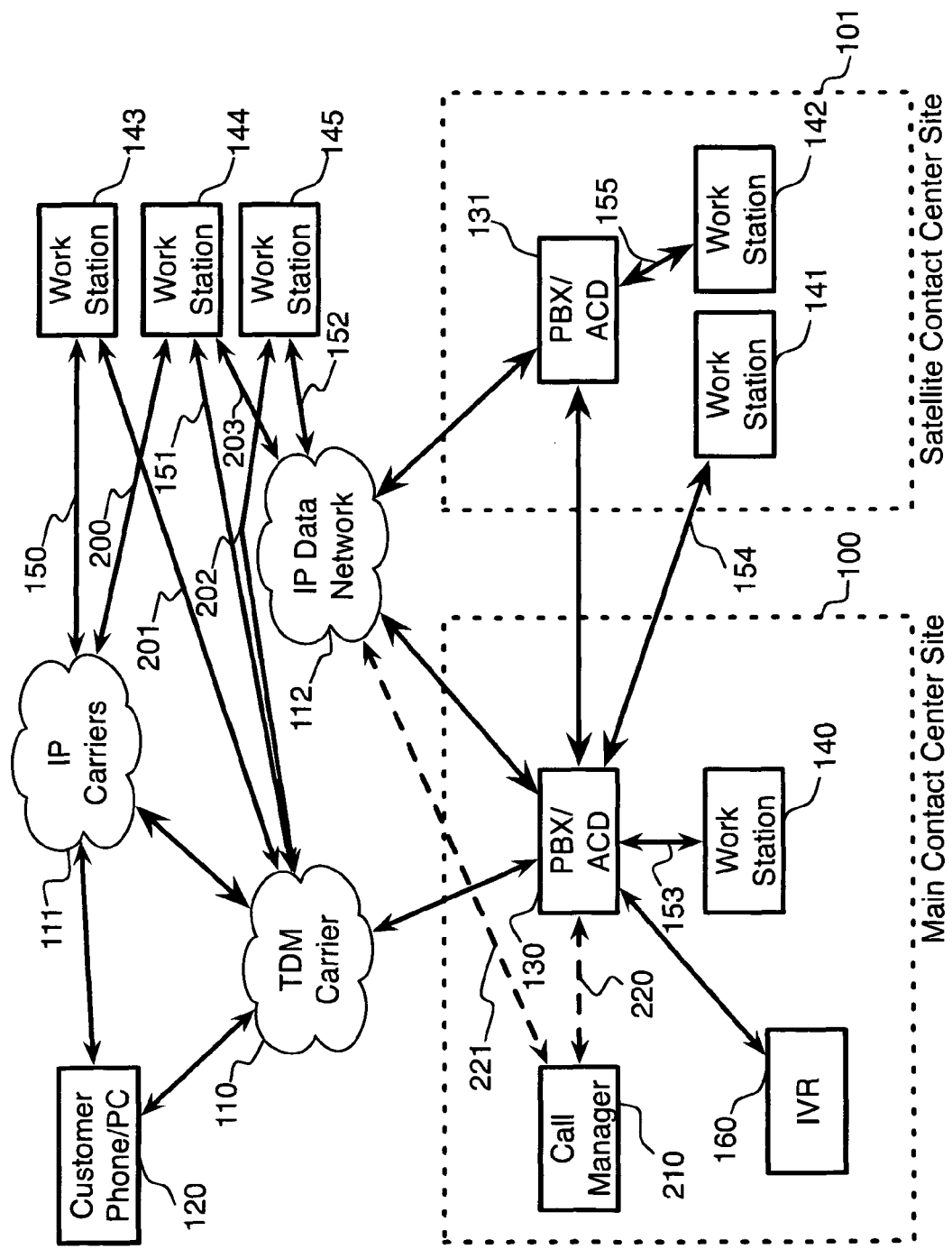
FIG. 2 is a block diagram illustrating a system for adaptive call management, according to an embodiment of the invention.

According to a preferred embodiment of the invention and referring to FIG. 2, the problem of voice call quality (especially IP-based call quality) is addressed by providing, when appropriate, at least a second voice media channel that can be used when call quality drops below some threshold, or falls outside of some established acceptable range (which could be time-dependent, and which could depend on any number of external variables). In this document, examples typically consider cases of voice quality with IP telephony calls, but it is known that TDM-based PSTN carriers also encounter issues that can be addressed through this invention. While adaptive call management approaches according to the invention are illustrated in FIG. 2 with respect to external (remote) agents who might be working from home or from small satellite branches or offices of an enterprise (or a partner of an enterprise), it should be understood that this choice is for illustrative purposes only (because guaranteeing IP call quality is impossible when an enterprise does not control the infrastructure of IP carrier 111 or IP data network 112), and is exemplary in nature; various embodiments of the invention may be put into practice entirely within an enterprise's infrastructure "footprint", such as by maintaining two voice media channels to agents located at satellite site 101. According to the embodiment, call manager 210 receives quality measurements pertaining to IP call quality for IP calls or sessions 159, 151, 152, and the like. That is, call manager 120, which is a software server application stored and executing on a computer connected via a data network to ACD 130, receives updates on all IP active call legs, or alternatively on all possible IP connection paths, or both, in order to monitor quality of calls in progress or likely quality of calls that might be sent to the respective agents, and particularly where the IP signal path to an agent workstation (143, 144, 145, and the like) is not under the control of the enterprise to which call manager 210 pertains. For example, if an agent at workstation 143 uses a third party IP carrier, the enterprise to which main contact center site 100 belongs is unable to control the final leg of any IP signal path from ACD 130 to workstation 143. If a customer call is sent to the agent at workstation 143 and IP call quality is low (for example, because a teenager at the same household has commenced a large file download), it is desirable to provide a means for the enterprise to correct the situation. In this situation, according to the embodiment, call manager 210 receives an indication the voice channel quality of call 150 is poor, and call manager 210 causes a new call 201 to be established using TDM telephony (which generally enjoys much higher and more consistent signal quality). When the new call 201 is established, call manager 210 causes it to be merged with the existing, low quality call 150, and then causes the IP call leg 150 to be dropped so that the customer call is now passing only over higher-quality channel 201. Similarly, in the case of workstation 144 where only TDM calls were used in the prior art illustrated in FIG. 1, it may be desirable according to the invention to provide additional, lower-cost IP telephony channels 200 and 203 to workstation 144 from IP carrier 111 in order to reduce cost of calls going to the agent at workstation 144. In this case, calls would preferentially be routed via a lower cost consumer IP voice channel 200 but would be shifted to a higher-cost leased IP telephony channel 203 and possibly to the original, highest-cost TDM channel 151 by call manager 210 as call quality measurements on the lower cost channels 200 and 203 require. Similarly, according to an embodiment of the invention, workstation 145 is provided with a second, higher-cost and higher-quality TDM phone line 202 in order that call manager 210 may, when call quality on existing leased IP telephony connection 152 warrants it (by being too low, or by being outside of an acceptable range, or by any other quality-driven business rule), shift calls from a low-cost channel 152 to a higher-cost channel 202 to improve quality. This, according to various embodiments of the invention, call manager 210 makes ongoing optimization decisions in which a desired quality range is maintained, at minimum cost.

It should be noted that other approaches to optimizing the combination of quality and cost are possible, according to the invention. Quality and cost tend to be tightly correlated when considering various media channels that could optionally be used to deliver a call to a selected target (recall this is a function of call manager 210, controlling ACD 130, which could be any suitable media routing or switching system). So for example, a specific enterprise may desire to maintain reasonably high call quality, and to select as a default a media channel suited to deliver this, which media channel might be priced on a cost-per-quality-level-achieved basis. In such a situation, if call quality on the selected media channel were to increase above some specified range, it would be desirable to switch to a lower-cost, lower-quality channel. Thus in many embodiments an acceptable range may be selected for quality or cost, and channel selection may change when one or the other of cost and quality moves outside of this range. In fact, arbitrarily complex optimization functions for a combination of quality and cost, applied to a plurality of available media channels, may be performed by call manager 210 (or, as discussed later, by quality server 510), according to the invention.

Furthermore, in some embodiments the invention is practiced by a service provider, such as an outsourcer, that provides services to a plurality of enterprises. In such situations, according to an embodiment of the invention, each client (served enterprise) specifies what quality and cost combinations it is willing to accept, and optionally each client may also specify specific algorithms or rules for optimizing the combination of cost and quality, and for determining the sampling policy (continuous, once per call, prior to each call, every 15 seconds, etc.—there are any number of sampling policies that could be selected, within the scope of the invention). Such client-specific configuration rules are stored, according to the invention, in a manner that allows them to be readily accessible to call manager 210 or quality server 510. In some cases clients may specify a higher-cost media channel type as standard (for instance, ISDN from a specific carrier), with the understanding that, should there be quality problems on the higher-cost channel, an alternate, lower-cost media channel should be selected by call manager 210 (this is an example where a general tendency of quality to track with cost breaks down). It will be understood by those having ordinary skill in the art of configuration systems for enterprise applications that there are a wide variety of choices for architecture and even form of configuration data, none of which is specifically relevant to the invention.

Another type of configuration data normally stored in association with call manager 210 or alternately at ACD 130 pertains to available media channels at each agent workstation 140-145. Not all agents will be identically equipped or provisioned, particularly when home or remote agents are used. Therefore it is important that call manager 210 knows, prior to determining which media channel to use once a specific target (usually, but not necessarily, an agent) is selected by ACD 130 or an equivalent routing system. This information is commonly stored in configuration databases associated with routing systems or ACD 130, but could be stored optionally in call manager 210 or any accessible database. Again, the present invention does not depend on any particular configuration subsystem, and anyone having ordinary skill in the art will appreciate that there are many robust choices available for storing, accessing, and maintaining configuration data.

According to an embodiment of the invention, call manager 210 operates to maintain an overall quality level within an area, or for a specific client, or for a specific business line, rather than for an individual agent workstation. In such a situation, an allowable quality level for a given media channel at a given agent workstation may vary over time, rather than be fixed in a configuration system. For example, if an overall regional target is set and at a particular time the overall quality is well within range, then quality at agent workstation 145 may be allowed to degrade more than at other times (when the regional level is not so high). Clearly, in such scenarios it may not be desirable to tie agent compensation to call quality or to media channel selection, as the agent would not be in full control. This example demonstrates again that there are a wide variety of business rules than may be implemented according to the invention.

Figure 3:
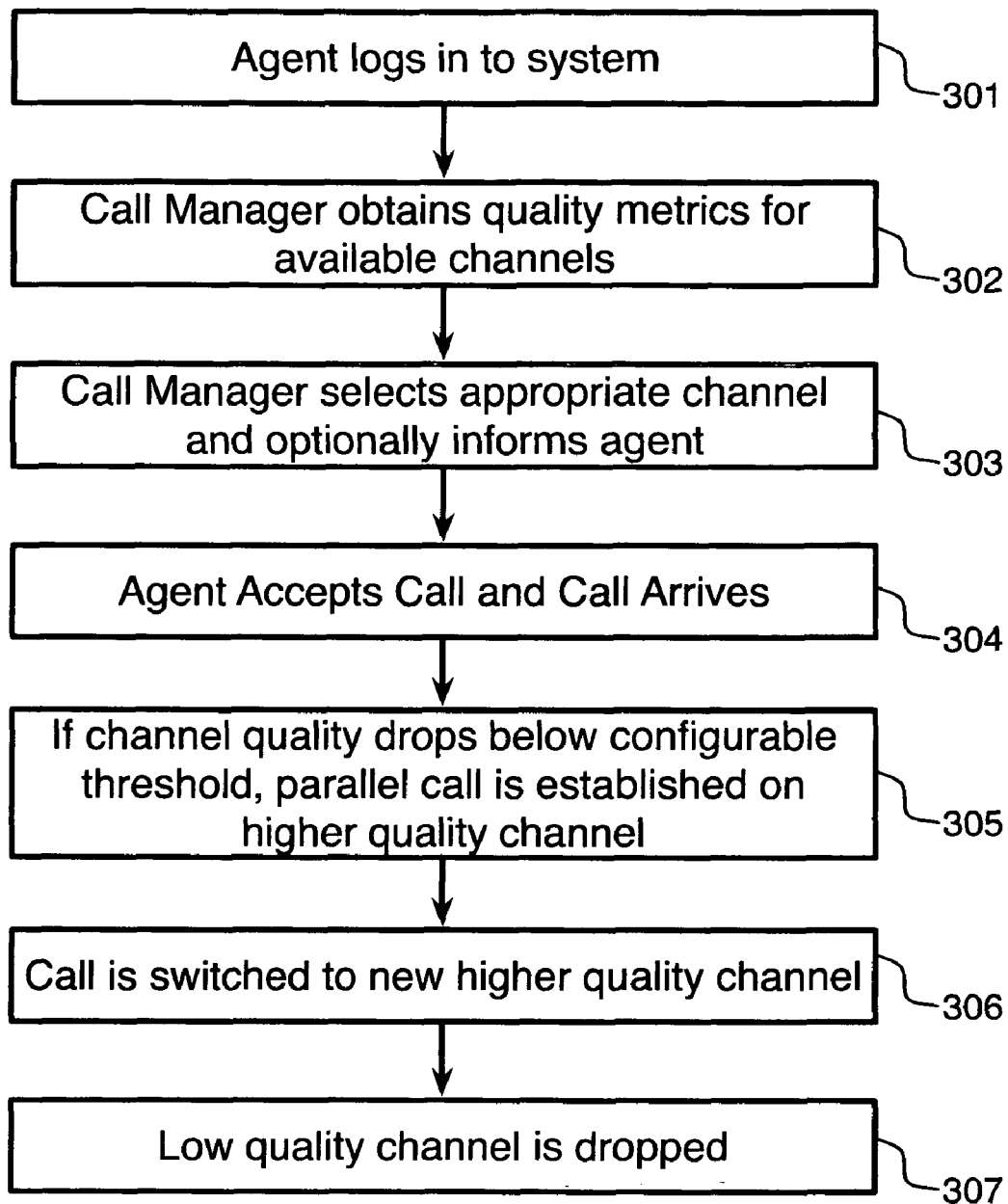
FIG. 3 is process flow diagram of a method for adaptive call management, according to an embodiment of the invention.

FIG. 3 outlines a method, according to an embodiment of the invention, for adaptively managing call quality in a contact center operation. Similar methods may be used in non-contact center situations, such as for handling call traffic between two physically separated facilities of a common enterprise, or even peer-to-peer telephone conversations between two consumers practicing adaptive call management according to the invention. In step 301, an agent logs in to a system using adaptive call management according to the invention, typically by logging in to ACD 130. The agent could be located at a local workstation 140 (that is, a workstation located at a main contact center site 100 where ACD 130 also resides), or at a workstation 141 at a satellite contact center 101, or located remotely either at home or at a non-contact facility of the enterprise or one of its partners, at one of workstations 143-145. Alternatively in step 301 an agent logs in to a system using adaptive call management according to the invention by logging in to remote ACD 131 from workstation 142. As before, it is important to realize that all of these instances are but various embodiments of the invention, and there are many other arrangements for agents or other participants to log in to a system according to the invention. In step 302, call manager 210 obtains quality measurements for available channels (that is, for voice paths available for delivery of, or currently in use handling, voice calls to the logged-in agent). Quality measurements may be taken using any of a number of techniques known in the art, some of which were mentioned in the background section of this application. The inventor does not consider actual quality measurement to be within the scope of the invention, and considers it well understood in the art that there are several methods available to measure various aspects of IP telephony call quality (including, but not limited to, minimum bandwidth available, packet loss, jitter, echo, and the like). Based on the quality measurements obtained, call manager 210, in step 303, selects an appropriate channel for the given agent. In some embodiments, the agent is informed ahead of time of the channel selected. This may be important in situations, such as those in which home agents find themselves, where the agent is responsible for maintaining call quality on a low-cost, typically (but not necessarily) interne protocol-based, voice channel. For instance, if a home agent maintains a DSL connection at her own expense and participates part-time in a contact center as an agent, she may be responsible for maintaining sufficient bandwidth to receive calls via virtual private network (VPN) over the DSL line with "good enough" quality. When quality that does not meet the standard is measured by call manager, the agent may be notified so that she may attempt to take steps that would improve the situation; for example, if she found that a member of the household was viewing a streaming video, she could cause that action to be terminated, thereby freeing up additional bandwidth and possibly restoring call quality to satisfactory levels. Various incentives may be provided, according to the invention, to motivate home agents to take such steps, such as dropping agents out of a call rotation when their IP call quality is too low, or reducing the price paid to the agent per call when call quality is too low or when a higher-cost channel is required, or simply by requiring the agent to pay for the differential cost of the higher-quality channel (typically the long-distance TDM channel), such payment typically (but not necessarily) being deducted from the agent's payments for calls handled. Also, in some embodiments, agents are provided with a means (typically an action taken in a desktop application provided by or for the enterprise controlling ACD 130) to signal to call manager 210 that they believe they have improved call quality. Upon receipt of such a signal call manager may repeat step 302 and, if quality has indeed improved sufficiently, in a repeated step 303 a lower-cost channel may be selected instead of a previously-selected, higher-cost channel. In step 304, an agent accepts a call and the accepted call arrives at workstation 140-145. Not all embodiments require an explicit acceptance of a call by an agent; in some embodiments calls are pushed to a workstation 140-145 and the applicable agent is then prompted to answer it (by a well-known signal such as a ring-tone). In yet other embodiments, calls may be automatically answered either by specialized ACD-coupled telephones or by specially-adapted desktop applications at workstations 140-145; all of these approaches to call establishment are well-known in the art.

In an embodiment of the invention, adaptive call management is provided in step 305 when, during an ongoing call and in response to ongoing call quality measurements directed by call manager 210 (or alternatively by workstation 140-145, which may be equipped with local call quality monitoring applications 410 that continuously or periodically sample call quality and send results to call manager 210), call manager 210 detects that call quality drops below configurable threshold, or passes out of a configurable acceptable range, or violates some other alternative business rule that determines whether quality is acceptable. In response to the condition of unacceptably low call quality, call manager 210 directs ACD 130 or 131 to establish a parallel call to the applicable workstation using a higher-quality channel. For example, in step 305 call manager may direct ACD 130 to establish a TDM call to a home agent's phone at workstation 143 when it detects that the call quality of an IP telephony call 201 is unacceptable. In step 306, the active call (that is, the call in which the customer is participating at customer phone or personal computer 120) is switched to the parallel channel of higher quality. This can be accomplished in various ways known in the art, for instance by merging the calls at the PBX 130. The actual commencement of step 306 is triggered, in some embodiments, automatically once the parallel call is established in step 305. In other embodiments, explicit action may be required on the part of the agent before the call switching or merger of step 306 is undertaken. In many embodiments it is possible for adaptive call management by switching to a higher quality channel while a call is in progress is completed without audible indication to at least one of the participants (typically the calling or called consumer at workstation 120). For example, when merging calls, most call switching devices that support IP telephony, TDM telephony, ISDN telephony, or some combination of these, are able to merge calls without an audible signal being apparent to participants in the call. In other embodiments it is desirable for a calling (or called) consumer at workstation 120 to receive an audible indication of adaptive call management actions such as call leg switching. For example, in some embodiments, an agent at workstation 145 informs a consumer at station 120 that she is about to switch the call to a better line, and obtains the consumer's concurrence before authorizing or executing the switch. In another embodiment, an agent at workstation 145 or equivalent is provided with an audible indication that adaptive call management action is being taken, for example by providing the agent with a "whisper tone" or "whisper announcement", as is well-known in the art. In yet other embodiments, it is desirable that one or more parties take an active role in managing adaptive call management. For example, in an embodiment, once the parallel path has been established, a message is displayed to the agent informing him that call quality has degraded and that a parallel call path has been established; on acknowledgment of the situation, or on acceptance and explicit request of the agent, the call switching or merger of step 306 is undertaken. Finally, in step 307, the low-quality channel is dropped at ACD 130, typically under control of, or at the request of, call manager 210. In some embodiments, an explicit confirmation by the agent that the customer has successfully been switched to the new, higher-quality channel, is required before step 307 is initiated.

Figure 4:
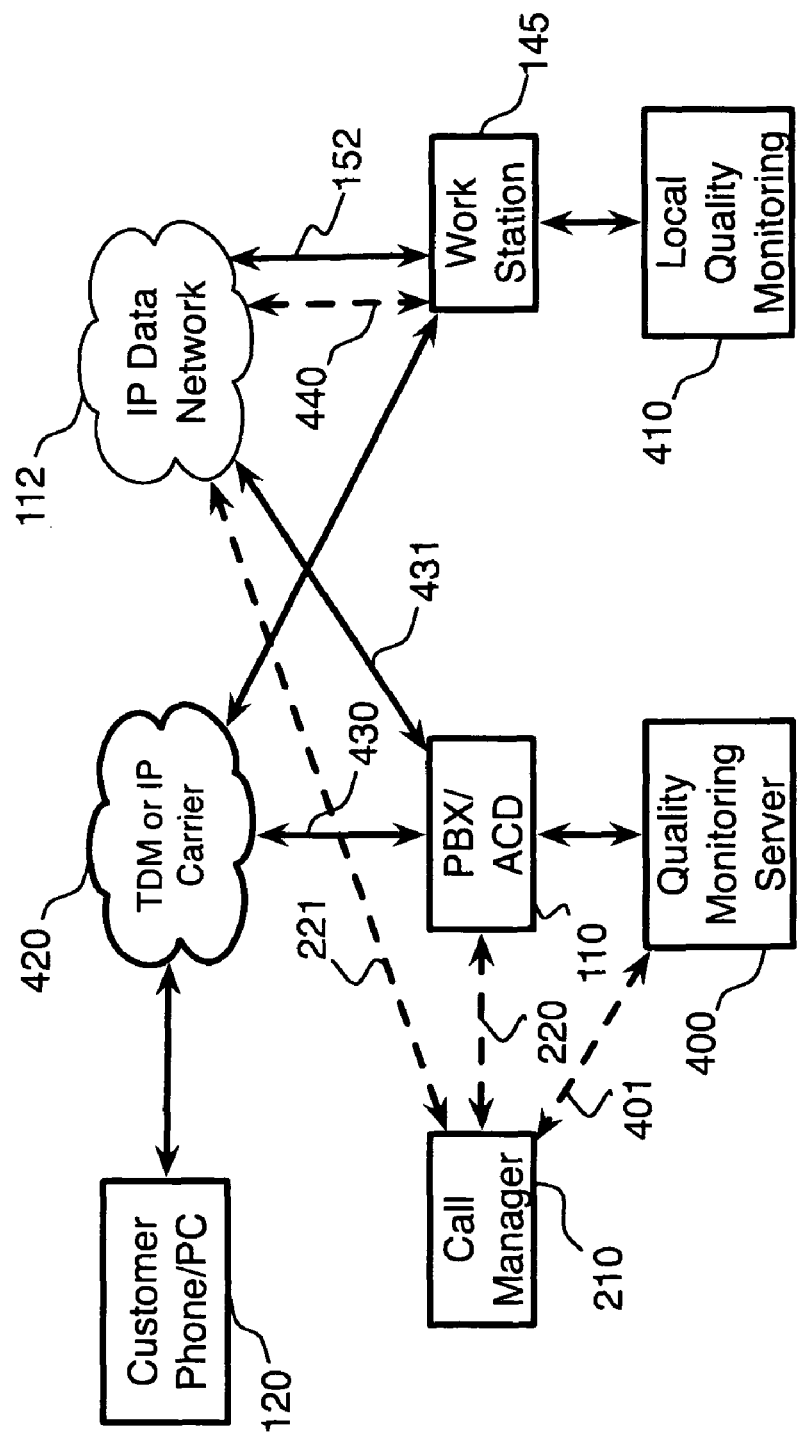
FIG. 4 is a block diagram illustrating a particular system for adaptive call management in more detail, according to an embodiment of the invention.

Examining this process in more detail, and referring to FIG. 4, there are various detailed ways in which the method of FIG. 3 may be implemented or carried out. In some embodiments, a call quality monitoring server 400 is connected to PBX/ACD 130 and call manager via a local area network (LAN) or other suitable digital data network (connections 220 and 401). The quality monitoring server 400 also is connected via at least one and usually several (typically digital) telephony circuits, which are adapted to be bridged onto existing calls in order to measure call quality. Call monitoring server, in most embodiments, operates under the control of call manager 210, although it can operate independently as well, according to the invention (in independent mode, quality monitoring server 400 establishes its own quality monitoring policies, carries them out, and informs call manager 210 of results). As before, quality monitoring server 400 uses any of the many call quality measurement techniques known in the art, without departing from the scope of the invention. In some embodiments, quality monitoring server establishes a test call from ACD 130 to agent workstation 145 (only one of the several possible agent workstations 140-145 is illustrated in FIG. 4, but no loss of generality is intended; rather, only one is shown for clarity, as the same methods and architectures may be used with any of the agent workstation modalities illustrated in FIG. 1 and FIG. 2, and indeed with any possible agent workstation modalities), and then measures quality of the voice channel used by the test call to determine channel quality. In other embodiments, quality monitoring server 400 periodically checks voice channel quality during each IP telephony call to agent workstation 145 to obtain regular quality measurements. Quality monitoring server 400 in some embodiments only checks voice channel quality when explicitly asked to do so by call manager 210, while in other embodiments quality monitoring server 400 makes its own determination of when and how to check quality.

In an embodiment of the invention, IP voice channel quality is measured from the client side, at agent workstation 145, using local quality monitoring means 410. In most cases, local quality monitoring means 410 is a software application running on the same computer as workstation 145, that is, on the same computer that acts as an IP telephony endpoint. In some embodiments, however, agent workstation 145 (for example) is equipped with a dedicated IP telephone, or with a special network-connected IP telephony device that allows conventional analog phone sets to connect using a standard RJ-11 connection. As with quality monitoring server 400, there are a variety of techniques available in the art for measuring IP telephony voice channel quality with local quality monitoring means 410, any of which may be used according to the invention.

In some embodiments of the invention, quality measurement is performed by a combination of quality monitoring server 400 and local quality monitoring means 410, for example by comparing a composite quality score computed from a quality indicium obtained from quality monitoring server 400 (for example, a bit error rate measurement) and a quality indicium obtained from a local quality monitoring means 410 (for example, an agent-provided qualitative assessment of quality). It will be understood by those having ordinary skill in the art that there are numerous methods of combining quality indicia to obtain a composite or overall quality score for a plurality of media channels. For instance, if measurements are made of a similar metric (such as bit error rate, pulse jitter, or packet loss, in the case of IP telephony sessions, or call connection rates, abnormal call drop rate, or D channel error rates, in the case of TDM or ISDN telephony) at two different locations (or two different times), the measurements may be averaged together, and the averaging function may be a weighted average with weights assigned to each measurement corresponding for example to its likely overall impact on perceived quality. In other embodiments, when dissimilar metrics are used, as for example when assessing aggregate quality for a plurality of media channels, some of which are carried over circuits belonging to common telephony carriers, and others of which are carried over leased IP data networks, each metric may be compared to a normative standard appropriate for the metric, and a metric-independent quality index computed thereby, such that metric-independent quality indices pertaining to dissimilar metrics may be compared to each other (or averaged together) to assess relative quality of dissimilar media channels.

In some embodiments, an agent working at agent workstation 145 is given access to local quality monitoring means 410 (or indeed, an agent may personally own such local quality monitoring means 410). According to these embodiments, an agent can turn on local quality monitoring means 410 at any time to obtain local quality measurements, which the agent can then use to determine if action is required to improve quality (for instance, by checking for heavy bandwidth applications on other computers at the same location). Furthermore, an agent is in some embodiments provided with an interface means at workstation 145 by which they may indicate to local quality monitoring means 410 their personal assessment of the quality of a call in which they are involved; that is, an agent is enabled to send a signal to local quality monitoring means 410 to the effect that "this call has poor quality". In preferred embodiments of the invention, local quality monitoring means 410 is adapted to communicate, over either the Internet or a virtual private network, with one of call manager 210 and quality monitoring server 400 (typically the latter). In these embodiments, quality measurements from the client (agent) side can be used instead of, or in addition to, quality measurements taken at quality management server 400. Furthermore, in some embodiments quality monitoring server 400 is adapted to receive quality measurements from an IP service provider equipped to sample quality at one or more points on the data path between ACD 130 and agent workstation 145. In some embodiments of the invention, agent workstation 145 provides historical quality monitoring data to an agent in order to allow an agent to assess whether there are recurring problems that require attention. For example, if an agent notes that quality is marginal every day between 3:00 pm and 5:00 pm, the agent may be faced with a choice of upgrading to a higher-level broadband service or accepting a lower rate of pay during that period, which choice can be made rationally when all relevant data is available.

Figure 5:
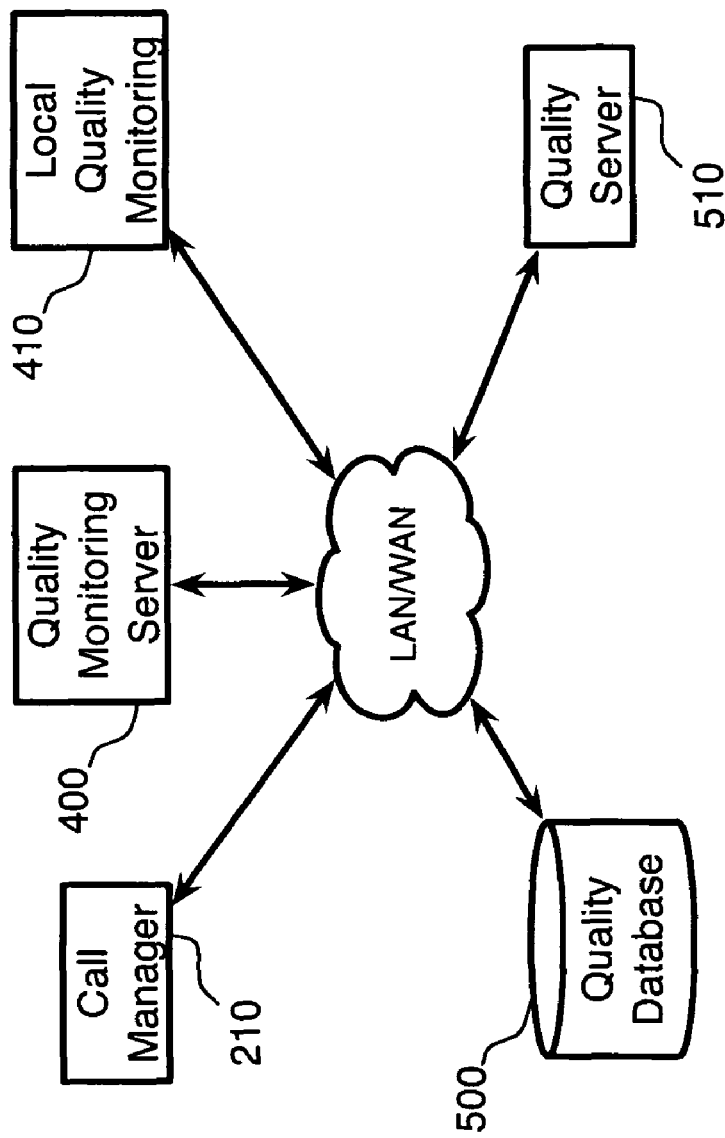
FIG. 5 is a block diagram illustrating a further embodiment of the invention that includes a predictive quality management capability.

In a preferred embodiment of the invention, and referring to FIG. 5, a data collection and analysis element is added that enables quality server 510 to predictively or proactively manage call quality. As call quality measurements are received from quality monitoring server 400 or local quality monitoring means 410, or both, they are stored in quality database 500. Quality database 500 may be stored in a relational database system operating on a storage-optimized computer platform coupled to local area network, wide area network, or storage area network 520, although in some embodiments quality database 500 may be resident on the same machine as quality server 510. It should be appreciated by those having ordinary skill in the art of database design and management that there are many possible arrangements that can be envisioned in accordance with the invention for the particular physical location of quality database 500. Quality server 510, in preferred embodiments, is adapted to receive each quality measurement via network 520 from either quality monitoring server 400, local quality monitoring means 410, or both. Upon receiving a new quality measurement for a particular agent workstation (such as workstation 145 discussed with reference to FIG. 4), quality server retrieves one or more previous results from the same workstation from quality database 500. With a series of quality readings thus in hand, quality server 510 calculates a likely future value of IP telephony call to the specific workstation, for example by a simple linear extrapolation from the series of (time, quality) value pairs (historical pairs from quality database 500 or possibly stored in local memory of quality server 510; most recent value from quality monitoring server 400 or local quality monitoring means 410). By predicting a likely future value of IP telephony call quality and sending a predicted value to call manager 210, quality server 510 makes it possible for call manager 210 to shift to a higher-quality (and, generally, higher-cost) channel before call quality degrades below and acceptable level or before call quality falls outside of an acceptable range.

In some embodiments of the invention, quality server 510 uses historical quality data obtained from quality database 500 to determine a time profile of quality for a given agent workstation 140-145 or for a region, client, or line of business. For example, quality server 510 might determine that, during a particular period of each weekday, traffic is very high and quality is degraded within a certain metropolitan area. Or, it may find that a certain group of agent workstations 140-145 routinely suffers from low quality scores during a period from 8:00 pm to 10:00 pm, local time. In such cases, quality server 510 may, according to the invention, proactively or preemptively select a higher-quality (and typically higher-cost) media channel for the affected region or agents. In some cases, affected agents may be informed of the problem and provided an opportunity to address recurrent quality issues, in order to restore their ability to use low-cost channels during affected time periods.

In some embodiments, quality server 510 manages the quality monitoring function, sometimes differently for different clients, by determining (or accepting) policies for mode and frequency of quality observations. For example, quality server 510 may, for a specific client (in an service provider scenario) or a specific business area, specify that quality measurements should be taken before sending a call to any agent who is working at agent workstation 145 located in the agent's home. The same quality manager 510 might, for another client or business, specify that quality measurements should be performed every five minutes when no calls are in progress at an agent workstation, but every 30 seconds when one or more calls is in progress. In other cases, quality server 510 may specify (or a client or other user may specify by changing a configuration option) that quality monitoring should only be performed when requested by an agent or by call manager 210 (this might be done, for example, for line quality monitoring that involves a third party and a charge per measurement taken). It should be clear that many possible monitoring policies are possible, and that many may be in effect at any given time, according to the invention.

In some embodiments, quality server 510 computes prices or penalties to be paid to or charged to agents, based at least in part on one or more related quality metrics. For example, if an agent allows call quality to fall or remain below a minimum level, or outside an acceptable range, quality server 510 may compute a price differential of a reduction in price to be paid to the agent. A price reduction could be used simply to offset added costs of using a higher-quality channel, or it could affect a selection of calls sent to an affected agent. For example, if calls are routed at least in part based on either cost or quality status or ratings of agents, then failure to maintain sufficient IP telephony call quality could lead to an agent's receiving fewer, or less lucrative, calls until quality is restored. In some embodiments, agents whose workstations show degraded quality may be excluded from receiving one or more classes of calls which the agents would otherwise have been eligible to receive. Quality server 510 thus acts, in some embodiments, to provide incentives to agents (or partners, who might be entities with multiple agents acting as a single economic partner to the enterprise operating contact center 100) to proactively maintain high IP telephony call quality, for instance by using appropriate equipment and by limiting use of broadband connections by others during call-taking periods.

In some embodiments of the invention, either quality server 510 or call manager 210, or both, evaluates quality at various levels of spatial or temporal granularity, and makes adaptive call management decisions based on the evaluations, which decisions may affect call management on a different level of spatial or temporal granularity than the specific results analyzed. For example, call manager 210 may determine that a set of agents residing in a particular metropolitan region, or depending on a particular central office of a specific carrier, is experiencing degraded quality over a recent time period. In response, call manager 210 might determine that an optimal adaptation would be to move all high-priority calls away from any agents in the given metropolitan area or depending on the affected carrier's specific infrastructure (or in some cases depending on the affected carrier, regardless of which infrastructure of said carrier is being used), in order to avoid a cascading quality management problem.

Figure 6:
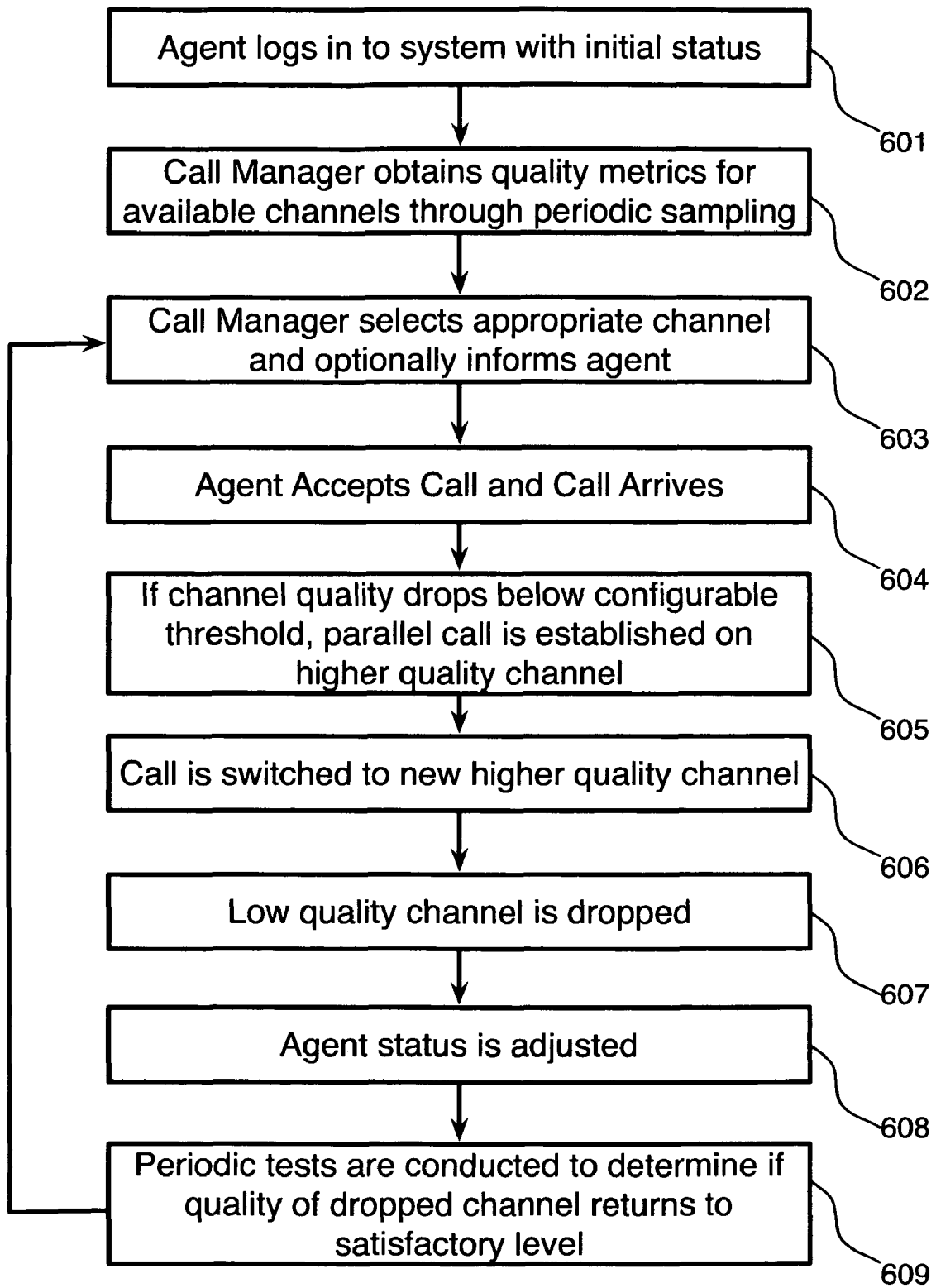
FIG. 6 is a process flow diagram illustrating an embodiment of the invention in which call quality is adaptively managed by changing from a low-quality channel to a higher-quality channel during a call.

FIG. 6 illustrates a process, according to an embodiment of the invention, by which adaptive call management is achieved at least in part by proactively testing call quality and restoring degraded connections back to service as soon as possible. It generally is not to the advantage of an enterprise to shift to higher-cost, higher-quality channels any longer than is necessary to maintain quality above some threshold or within some acceptable range. In fact, some enterprises may choose to embed quite varied business rules in quality server 510 in order to reflect varying levels of commitments respectively to quality and cost, for different classes of calls or callers. The process of FIG. 6 is in many ways identical to that of FIG. 3, and only the differences will be elaborated here. In step 601, when an agent logs in to a system the agent is assigned an initial status. Status assignment can be effected by quality server 519, call manager 210, or any business application coupled to one or the other of these two servers and adapted to receive timely quality information pertaining to IP telephony call quality for channels associated with the specific agent. For example, an agent logging in, whose IP telephony call quality in previous sessions was quite good, would be given a preferential status relative to one who had experienced serial quality failures in recent sessions. As before (refer to FIG. 3), steps 602 through 607 provide for periodic quality measurements and adaptive call management. In step 608, however, agent status is optionally adjusted when quality interventions (for example, the switching to a higher-cost, higher-quality channel described in steps 6505-607) are invoked or occur. As discussed with reference to FIG. 5, changes in agent status may result in changes in compensation or call distribution to affected agents. Finally, in step 609, periodic tests are conducted by either quality monitoring server 400 or local quality monitoring means 410, or both, under control of either quality server 510, quality monitoring server 400, or call manager 210. Upon completion of periodic tests, if quality results were changed from previous tests, the process of FIG. 6 resumes at step 603 with the selection of an appropriate channel.

All of the embodiments described herein are exemplary in nature and should not be taken to limit the scope of the invention, as claimed.

What is claimed is:

1. A system for adaptive call management, comprising:
   a network-connected call manager server;
   a call switching device coupled to the call manager server and adapted to deliver calls to a selected target via a plurality of media channels; and
   a quality monitoring server coupled to the call manager server and configured to monitor on-going calls being managed by the call manager server;
   said network-connected call manager server being configured to:
   (a) access client-specific configuration rules of a client, said rules specifying an optimizing combination of cost and quality of calls relating to the client;
   (b) obtain an indicium of call quality of a call for the client from said quality monitoring server;
   (c) select a media channel based at least in part on the call quality indicium and the client-specific configuration rules of the client to optimize the combination of cost and quality; wherein a lower or higher quality media channel may be selected depending on said rules to maintain a desired quality range at a minimum cost;
   (d) notify an agent handling the call of the client when call quality is below a threshold standard; and
   (e) incentivize the agent to improve the call quality.

2. The system of claim 1, wherein selection of a media channel is based at least in part on a cost associated with each of the available channels.

3. The system of claim 1, wherein selection of a media channel is made based at least on a comparison of a call quality indicium with an allowable range.

4. The system of claim 2, wherein selection of a media channel is made based at least on a comparison of a call quality indicium with an allowable range.

5. The system of claim 3, wherein, when a call quality indicium falls outside of an acceptable range during a call, an alternate channel is selected and the call is switched to the alternate channel.

6. The system of claim 4, wherein, when a call quality indicium falls outside of an acceptable range during a call, an alternate channel is selected and the call is switched to the alternate channel.

7. The system of claim 5, wherein switching of a call from one media channel to an alternate channel is accomplished without audible indication of said switching to a call participant.

8. The system of claim 6, wherein switching of a call from one media channel to an alternate channel is accomplished without audible indication of said switching to a call participant.

9. The system of claim 5, wherein switching of a call from one media channel to an alternate channel is accomplished with active involvement of at least one call participant.

10. The system of claim 6, wherein switching of a call from one media channel to an alternate channel is accomplished with active involvement of at least one call participant.

11. The system of claim 5, wherein switching of a call from one media channel to an alternate channel is accomplished with audible indication of said switching to a call participant.

12. The system of claim 6, wherein switching of a call from one media channel to an alternate channel is accomplished with audible indication of said switching to a call participant.

13. The system of claim 1, in which quality indicia pertaining to media channels of different types are used to select a media channel.

14. The system of claim 2, in which quality indicia pertaining to media channels of different types are used to select a media channel.

15. A method for adaptive call management, comprising the steps of:
   (a) monitoring an on-going call of a client;
   (b) accessing client-specific configuration rules of the client, said rules specifying an optimizing combination of cost and quality of calls relating to the client;
   (c) obtaining an indicium of call quality based on said monitoring;
   (d) selecting a media channel based at least in part on the call quality indicium and the client-specific configuration rules to optimize the combination of cost and quality; wherein a lower or higher quality media channel may be selected depending on said rules to maintain a desired quality range at a minimum cost;
   (e) notifying an agent handling the call of the client when call quality is below a threshold standard; and
   (f) incentivizing the agent to improve the call quality.

16. The method of claim 15, wherein selection of media channel is made at least in part based on comparing a call quality indicium to an acceptable range.

17. The method of claim 15, wherein selection of media channel is made at least in part based on a cost associated with each available media channel.

18. The method of claim 17, wherein selection of media channel is made at least in part based on comparing a call quality indicium to an acceptable range.

19. The method of claim 17, further comprising the step of:
   (g) when a call quality indicium falls out of an acceptable range during a call, switching the call to an alternate media channel.

20. The method of claim 18, further comprising the step of:
   (g) when a call quality indicium falls out of an acceptable range during a call, switching the call to an alternate media channel.

21. The method of claim 19, wherein switching of a call from a media channel to an alternate channel is accomplished without audible indication to a participant in the call.

22. The method of claim 20, wherein switching of a call from a media channel to an alternate channel is accomplished without audible indication to a participant in the call.

23. The method of claim 19, wherein switching of a call from a media channel to an alternate channel is accomplished with active involvement of at least one call participant.

24. The method of claim 20, wherein switching of a call from a media channel to an alternate channel is accomplished with active involvement of at least one call participant.

25. The method of claim 19, wherein switching of a call from a media channel to an alternate channel is accomplished with audible indication to a participant in the call.

26. The method of claim 20, wherein switching of a call from a media channel to an alternate channel is accomplished with audible indication to a participant in the call.

27. The method of claim 15, wherein quality indicia pertaining to media channels of different types are used to select a media channel.

28. The method of claim 16, wherein quality indicia pertaining to media channels of different types are used to select a media channel.

29. A system for adaptive call management, comprising:
   a network-connected call manager server;
   a quality server coupled to the call manager server;
   a quality monitoring server coupled to the call manager server and the quality server and adapted to monitor quality of calls;
   a quality database adapted to receive at least time-stamped quality indicium from the quality monitoring server; and
   a call switching device coupled to the call manager server and adapted to deliver calls to a selected target via a plurality of media channels;
   said quality server being configured to:
   (a) access client-specific configuration rules of a client, said rules specifying an optimizing combination of cost and quality of calls relating to the client;
   (b) obtain an indicium of call quality of a call for the client from said quality monitoring server;
   (c) obtain at least one historical call indicum from the quality database;
   (d) direct the call manager server to select a media channel based at least in part on the call quality indicium, the at least one historical call indicum, and the client-specific configuration rules of the client to optimize the combination of cost and quality; wherein a lower or higher quality media channel may be selected depending on said rules to maintain a desired quality range at a minimum cost;
   (e) notify an agent handling the call of the client when call quality is below a threshold standard; and
   (f) incentivize the agent to improve the call quality.

30. A system for adaptive call management, comprising:
   a network-connected call manager server;
   a quality server coupled to the call manager server;
   a quality database adapted to receive at least time-stamped quality indicium from a quality monitoring server; and
   a call switching device coupled to the call manager server and adapted to deliver calls to a selected target via a plurality of media channels;
   said quality server being configured to:
   (a) access client-specific configuration rules of a client, said rules specifying an optimizing combination of cost and quality of calls relating to the client;
   (b) obtain a plurality of call quality indicia of calls for the client from said quality database;
   (c) direct the call manager server to select a media channel based at least in part on the plurality of call quality indicia and the client-specific configuration rules of the client to optimize the combination of cost and quality; wherein a lower or higher quality media channel may be selected depending on said rules to maintain a desired quality range at a minimum cost;
(d) notify an agent handling the call of the client when call quality is below a threshold standard; and
(e) incentivize the agent to improve the call quality.

31. A system for adaptive call management, comprising:
a network-connected call manager server;
a quality server coupled to the call manager server;
a quality monitoring server coupled to the call manager server and the quality server and adapted to monitor quality of calls;
a quality database adapted to receive at least time-stamped quality indicium from the quality monitoring server; and
a call switching device coupled to the call manager server and adapted to deliver calls to a selected target via a plurality of media channels;
said quality server being configured to:
(a) access client-specific configuration rules of a client, said rules specifying an optimizing combination of cost and quality of calls relating to the client;
(b) obtain an indicium of call quality of a call for the client from said quality monitoring server;
(c) select a media channel based at least in part on the call quality indicium and the client-specific configuration rules of the client to optimize the combination of cost and quality; wherein a lower or higher quality media channel may be selected depending on said rules to maintain a desired quality range at a minimum cost; wherein the quality server, on receiving a call quality indicium from the quality monitoring server, compares the call quality indicium to at least one historical call quality indicium obtained from quality database;
wherein the quality server computes an expected future call quality indicium for a media channel based at least on the call quality indicium received from the quality monitoring server and on the at least one historical call quality indicium, and compares this future call quality indicium to an allowable range; and
wherein, if the future call quality indicium falls outside of the allowable range, the quality server selects an alternate media channel;
(d) notify an agent handling the call of the client when call quality is below a threshold standard; and
(e) incentivize the agent to improve the call quality.

* * * * *

UNITED STATES PATENT AND TRADEMARK OFFICE
CERTIFICATE OF CORRECTION

PATENT NO. : 8,395,994 B2
APPLICATION NO. : 12/589831
DATED : March 12, 2013
INVENTOR(S) : Craig Stevenson et al.

Page 1 of 1

It is certified that error appears in the above-identified patent and that said Letters Patent is hereby corrected as shown below:

In the Claims:

Column 18, Line 36, delete "indicum" and insert -- indicium -- therefor;

Column 18, Line 40, delete "indicum" and insert -- indicium -- therefor.

Signed and Sealed this
Eleventh Day of June, 2013

Teresa Stanek Rea
*Acting Director of the United States Patent and Trademark Office*